United States Patent
Tallerico et al.

(10) Patent No.: US 7,125,037 B2
(45) Date of Patent: Oct. 24, 2006

(54) INFLATABLE CUSHION RETENTION SYSTEM

(75) Inventors: Roger Tallerico, Ogden, UT (US); Richard Welford, Layton, UT (US); Kurt Gammill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 303 days.

(21) Appl. No.: 10/690,416

(22) Filed: Oct. 21, 2003

(65) Prior Publication Data

US 2005/0082798 A1    Apr. 21, 2005

(51) Int. Cl.
B60R 21/16    (2006.01)
(52) U.S. Cl. .................. 280/728.2; 280/730.2
(58) Field of Classification Search ............. 280/728.2, 280/730.2, 730.1
See application file for complete search history.

(56) References Cited

U.S. PATENT DOCUMENTS

| | | | |
|---|---|---|---|
| 5,221,108 A | 6/1993 | Hirokazu | |
| 5,324,074 A | 6/1994 | Christian et al. | |
| 5,344,182 A | 9/1994 | Lauritzen et al. | |
| 5,398,960 A | 3/1995 | Ravenberg et al. | |
| 5,474,324 A | 12/1995 | Bentley et al. | |
| 5,498,023 A | 3/1996 | Adams et al. | |
| 5,647,607 A | 7/1997 | Bolieau | |
| 5,676,393 A | 10/1997 | Rose | |
| 5,730,463 A | 3/1998 | Fisher et al. | |
| 5,765,867 A | 6/1998 | French | |
| 5,788,270 A | 8/1998 | Haland et al. | |
| 5,823,566 A | 10/1998 | Manire | |
| 5,899,485 A | 5/1999 | Folsom et al. | |
| 5,899,486 A | 5/1999 | Ibe | |
| 5,899,489 A | 5/1999 | Jost | |
| 5,924,831 A | 7/1999 | Ricks et al. | |
| 5,931,492 A | 8/1999 | Mueller et al. | |
| 5,947,509 A | 9/1999 | Ricks et al. | |
| 6,070,904 A * | 6/2000 | Ozaki et al. ............. | 280/743.1 |
| 6,073,961 A | 6/2000 | Bailey et al. | |
| 6,103,984 A | 8/2000 | Bowers et al. | |
| 6,106,006 A | 8/2000 | Bowers et al. | |
| 6,135,490 A * | 10/2000 | Spary ..................... | 280/730.2 |
| 6,145,879 A | 11/2000 | Lowe et al. | |
| 6,152,961 A | 11/2000 | Ostiguy, Jr. et al. | |
| 6,168,186 B1 | 1/2001 | Welch et al. | |
| 6,206,409 B1 * | 3/2001 | Kato et al. ............... | 280/728.2 |
| 6,234,517 B1 | 5/2001 | Miyahara et al. | |
| 6,293,581 B1 | 9/2001 | Saita et al. | |
| 6,305,707 B1 | 10/2001 | Ishiyama et al. | |
| 6,336,651 B1 | 1/2002 | Mramor et al. | |
| 6,364,349 B1 | 4/2002 | Kutchey et al. | |
| 6,371,512 B1 | 4/2002 | Asano et al. | |

(Continued)

FOREIGN PATENT DOCUMENTS

DE    4137691    11/1992

(Continued)

*Primary Examiner*—Eric Culbreth
*Assistant Examiner*—Barry Gooden, Jr.
(74) *Attorney, Agent, or Firm*—Sally J Brown

(57) ABSTRACT

The cushion retention system includes a cushion, at least one tab attached to the cushion, and a supporting member having an intermediary region and at least one aperture. The cushion is positioned in a folded condition. The supporting member is disposed along an outer periphery of the cushion. The tab, which includes a head and a narrow neck, interlocks with the aperture on the supporting member to retain the supporting member along an outer periphery of the folded cushion. In this interlocked condition, the supporting members apply an inward compressive force to retain the cushion in a folded condition.

7 Claims, 6 Drawing Sheets

U.S. PATENT DOCUMENTS

| | | | | |
|---|---|---|---|---|
| 6,481,744 B1* | 11/2002 | Melia | .................. | 280/730.2 |
| 6,585,292 B1* | 7/2003 | Abe et al. | .................. | 280/743.1 |
| 6,698,792 B1* | 3/2004 | Heath | .................. | 280/743.2 |
| 6,802,526 B1* | 10/2004 | Dumbrique et al. | ...... | 280/728.2 |
| 6,808,199 B1* | 10/2004 | Saderholm et al. | ...... | 280/730.2 |
| 6,854,977 B1* | 2/2005 | DuRocher et al. | ............ | 439/15 |
| 6,889,999 B1* | 5/2005 | Dominissini et al. | .... | 280/730.2 |
| 2002/0074778 A1 | 6/2002 | Melia | | |
| 2003/0030256 A1* | 2/2003 | Meyer | .................. | 280/730.1 |
| 2003/0178832 A1* | 9/2003 | Dominissini et al. | .... | 280/743.2 |

FOREIGN PATENT DOCUMENTS

| | | |
|---|---|---|
| DE | 29916177 | 3/2000 |
| EP | 1 108 626 A2 | 6/2001 |
| EP | 1 223 084 A2 | 7/2002 |
| GB | 2309942 | 8/1997 |
| JP | 2002 240670 | 8/2002 |
| WO | WO - 9009295 | 8/1990 |
| WO | WO - 97/28990 | 8/1997 |
| WO | WO - 02/28690 | 4/2002 |

* cited by examiner

INFLATABLE CUSHION RETENTION SYSTEM

BACKGROUND OF THE INVENTION

1. Field of the Invention

The present invention relates to inflatable airbag systems. More specifically, this invention relates to a system for retaining an inflatable cushion in a folded condition.

2. Description of Related Art

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of a seat belt and an airbag, serious chest injuries in frontal collisions can be reduced by 65% and serious head injuries by up to 75%. Airbag use presents clear benefits and vehicle owners are frequently willing to pay the added expense for airbags. In addition, the inclusion of inflatable safety restraint devices, or airbags, is now a legal requirement for many new vehicles.

Airbag systems typically include three principal components: an electronic control unit (ECU), an inflator, and an inflatable cushion. The ECU monitors the acceleration and deceleration of the vehicle and determines when accident conditions exist. The ECU is in communication with the inflator and transmits a signal to the inflator when the ECU determines that the vehicle has been involved in an accident.

In response to receipt of the signal, the inflator generates inflation gas. The inflator can be designed to produce inflation gas using various methods. For instance, the inflator may use pyrotechnic techniques or simply release compressed gas. In addition, the inflator may use a combination of both pyrotechnics and compressed gas to produce pressurized inflation gas. The inflator is in fluid communication with the inflatable cushion.

The inflatable cushion receives the gas generated by the inflator and rapidly expands as the gas fills the cushion. The inflatable cushion is made from a flexible material, such as fabric. When expanded, the cushion receives the energy of an occupant impact and dissipates the energy such that injuries are minimized or avoided.

The positioning of the inflated cushion during a crash is critical to proper protection of an occupant. The inflated cushion should be positioned to shield the occupant from impacting hard surfaces within the vehicle, such as the steering wheel, windshield, or dashboard.

The most common type of airbag system stores the cushion and inflator in a compartment in the steering wheel. This type of airbag system is frequently referred to as a driver's side airbag system. When the vehicle is involved in an accident, the cushion receives the gas generated by the inflator, expands, and is propelled out of the compartment in the steering wheel. The cushion is fully inflated in a fraction of a second. The inflated cushion prevents the driver from striking the steering wheel and dissipates the kinetic energy of the occupant to minimize injury to the occupant. Similar airbag systems are frequently installed in the passenger side of the dashboard.

More recently, inflatable curtains have been used to protect vehicle occupants. Prior to deployment, inflatable curtains are generally stored in a compartment located above the side doors of the vehicle. When inflation gas is injected into the curtain, the curtain deploys in a downward direction to prevent the occupant from striking the side windows or doors of the vehicle during an accident.

Prior to installation in a vehicle, inflatable curtains must be tightly folded and secured within a retaining system. Conventional retaining systems may include a retaining sock. In one conventional embodiment, the folded cushion is pulled through a retaining sock having two openings. Thereafter, tabs, which are used to secure the cushion to a vehicle, are pulled through holes in the sock. Unfortunately, the cushion frequently becomes twisted while it is being pulled into the sock. As a result, the assembly line worker must often remove the sock and begin the insertion process again. Even if the sock does not become twisted, the sock itself makes it difficult for the assembly line worker to locate the tabs and pull the tabs through the openings in the sock. This process is time consuming and expensive.

In another conventional embodiment, the sock has an open side that is closed following insertion of the inflatable curtain into the sock. Various mechanical fasteners, such as Velcro, have been used to close the open side of the sock. Unfortunately, these mechanical fasteners are expensive and significantly increase the overall cost of the cushion module. Furthermore, the sock itself requires a significant amount of material, which increases the cost of the module. In addition, significant time is required to attach the mechanical fasteners into the sock.

Accordingly, there is a need in the art for a novel cushion retention system that addresses one or more of the above-listed problems. Such a system is disclosed herein.

SUMMARY OF THE INVENTION

The apparatus of the present invention has been developed in response to the present state of the art, and in particular, in response to problems and needs in the art that have not yet been fully solved by currently available airbag systems. The airbag retention system resolves these concerns in that it is simple in design, and less expensive than conventional retention systems. In addition, the airbag retention system is easier to use than conventional systems, thus diminishing the time required to place the cushion into the retaining system.

The cushion retention system includes supporting members, an inflatable cushion with one Or more chambers, and at least one tab attached to the cushion. The supporting members, in one embodiment, comprise elongated, or rectangular, segments of fabric. Other materials, such as polymers, may be used to make the supporting members. Each supporting member includes a first and a second aperture, an intermediary region disposed between the first and second apertures, and a tear seam.

The inflatable cushion may be embodied as an inflatable curtain that deploys in a generally downward direction from a lateral portion of a vehicle. Alternatively, the inflatable cushion may be embodied, for example, as a driver's side airbag or a passenger's side airbag.

The inflatable cushion includes one or more chambers. Adjacent chambers are separated by a divider. The divider may be formed by securing opposing sides of the cushion together using, for example, stitching. Each chamber may be independently inflatable or may be in fluid communication with another chamber.

As stated above, tabs are attached to the cushion. Accordingly, the tabs may be integrally formed with the cushion or may be separately manufactured and attached to the cushion. Each tab includes a head and a narrow neck disposed between the head and the cushion. Each tab may optionally include an opening. The tab may be used to secure the cushion to a vehicle using, for example, a bolt, screw, rivet, or hook.

The tabs may be made from fabric or a rigid material, such as metal. If the tabs are made from metal, the tabs may be secured within orifices in the cushion using, for example, crimping techniques, rivets, staples, screws, or other mechanical fastening devices. In such an embodiment, the cushion may include a reinforced region positioned proximate the orifices to limit damage to or ripping of the area surrounding the orifices, particularly during deployment of the cushion.

Each tab interlocks with apertures on one of the supporting members to retain the cushion in a folded condition. In particular, when the cushion is placed in a folded condition, each tab interlocks with the first and second apertures in one of the supporting members to retain the intermediary region of each supporting member around the cushion.

In particular, the tabs are sized to interlock with the first and second apertures on a one of the supporting members. Accordingly, the head of each tab has a width greater than the first and second apertures on one of the supporting members. The neck of each tab is more narrow than the attached head and is more narrow than or about the same size as the first and second apertures in one of the supporting members. As such, the head of each tab may be inserted through the first and second apertures of one of the supporting members to securely retain the neck of the tab within the apertures. When the supporting members and tabs are interlocked, the supporting members are disposed around the cushion and apply an inward compressive force to retain in a folded condition. Thereafter, when inflation gas is injected into the inflatable cushion, the tear seams on the supporting members rupture to permit the cushion to expand.

In an alternative embodiment, the supporting members are attached to the cushion. As such, the supporting members may be integrally formed with the cushion or may be separately manufactured and secured to the cushion. For example, the supporting members may comprise a portion of the divider between each chamber.

In this embodiment, each supporting member includes an extensible flap. The extensible flap is attached to the remainder of the supporting member by a tear seam. The extensible flap may be a separate piece attached to the supporting member or may be extracted or cut out from the supporting member.

An aperture is disposed in the extensible flap. The intermediary region in this embodiment spans from the aperture to a tab on the supporting member. The intermediary region is approximately the same length as the outer periphery of the cushion in a folded condition. Accordingly, when the cushion is placed in a folded condition, the intermediary region is positioned around an outer periphery of the folded cushion and each tab interlocks with an aperture on one of the extensible flaps. Thus, the supporting member applies an inward compressive force to retain the cushion in a folded condition. The tear seams rupture when inflation gas is injected into the cushion to permit expansion of the cushion.

The cushion retention system thus provides substantial advantages over conventional systems. In particular, the cushion retention system requires fewer materials than conventional retention systems, thus significantly reducing the overall cost of the airbag module. In addition, using this system, the tabs on the cushion are easy to locate and may be rapidly pulled through the cushion retention system. Accordingly, significant cost savings result from the use of this system both in terms of materials and installation time.

These and other features, and advantages of the present invention will become more fully apparent from the following description and appended, claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred-embodiments of the invention are now described with reference to FIGS. 1–6, wherein like parts are designated by like numerals throughout. The members of the present invention, as generally described and illustrated in the Figures, may be designed in a wide variety of configurations. Thus, the following more detailed description of the embodiments of the present invention, as represented in the Figures, is not intended to limit the scope of the invention, as claimed, but is merely representative of presently preferred embodiments of the invention.

In this application, the phrases "connected to," "coupled to," and "in communication with" refer to any form of interaction between two or more entities, including mechanical, electrical, magnetic, electromagnetic, electromechanical and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "directly attached to" refers to a form of attachment by which the attached items are either in direct contact, or are only separated by a single connector, adhesive, or other attachment mechanism. The term "abutting" refers to items that are in direct physical contact with each other, although the items may not be attached together.

Figure 1:
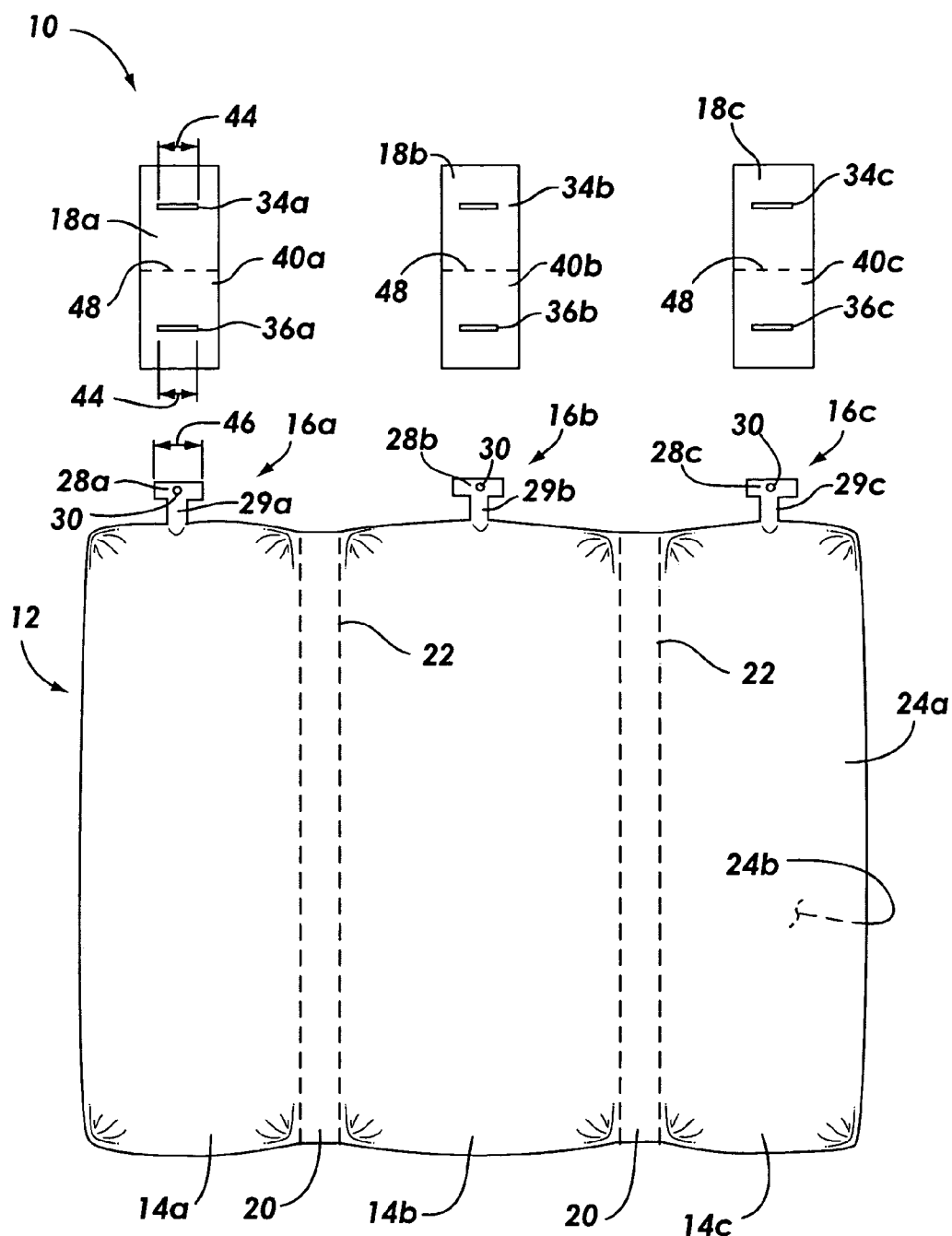
FIG. 1 is a plan view of a first embodiment of a cushion retention system of the present invention.

With reference to FIG. 1, there is shown a plan view of a first embodiment of the cushion retention system 10 of the present invention. The system 10 includes an inflatable cushion 12 having one or more inflatable chambers 14a–c, tabs 16a–c attached to cushion 12, and supporting members 18a–c for retaining the cushion 12 in a folded condition.

The illustrated inflatable cushion 12 is an inflatable curtain 12 that is designed to deploy in a downward direction along a lateral portion of a vehicle (not shown). However, it should be noted that the system 10 of the present invention can be implemented with other types of cushions 12, such as driver's side cushions, passenger's side cushions, or knee bolster cushions.

Other variations of the illustrated cushion 12 also come within the scope of the present invention. For instance, the illustrated cushion 12 includes three chambers 14a–c having a divider 20 between each chamber 14. As illustrated in FIG. 1, the chambers 14 may be integrally formed and separated by stitching 22, or other fastening techniques, that secure opposing sides 24a–b of the cushion 12 together. Alternatively, the chambers 14 may separately formed and secured together. The chambers 14 may be in fluid communication with each other or may be independently inflatable. Also, the number, shape, and relative size of chambers 14 may be varied with the scope of this invention.

The tabs 16 referred to above are attached to the cushion 12. Each tab 16a–c includes a head 28a–c and a narrow neck 29a–c. The narrow neck 29 of each tab 16 is positioned between each head 28 and the cushion 12. Tabs 16 of various shapes come within the scope of this invention. The head 28 of each tab 16 may have, for example, a rectangular, square, triangular, or nonsymmetrical shape.

Each tab 16 may also include an opening 30. The openings 30 are used to secure the cushion 12 to a vehicle (not shown). For example, a hook, bracket, screw, bolt, or other mechanical fastening device of a vehicle is positioned through the openings 30 to secure the cushion 12 to the vehicle. In embodiments in which the openings 30 are omitted, clamps, crimping or other securing techniques and devices may be used to secure the cushion 12 to a vehicle.

The tabs 16 may be integrally formed with the cushion 12 or may be formed separately and then secured to the cushion, using, for example, rivets, crimping, adhesives, or other types of mechanical fasteners. The system 10 of the present invention is not limited to cushions 12 having three tabs 16. For instance, the cushion 12 could include a single tab 16, two tabs 16, or more than three tabs 16.

Figure 2:
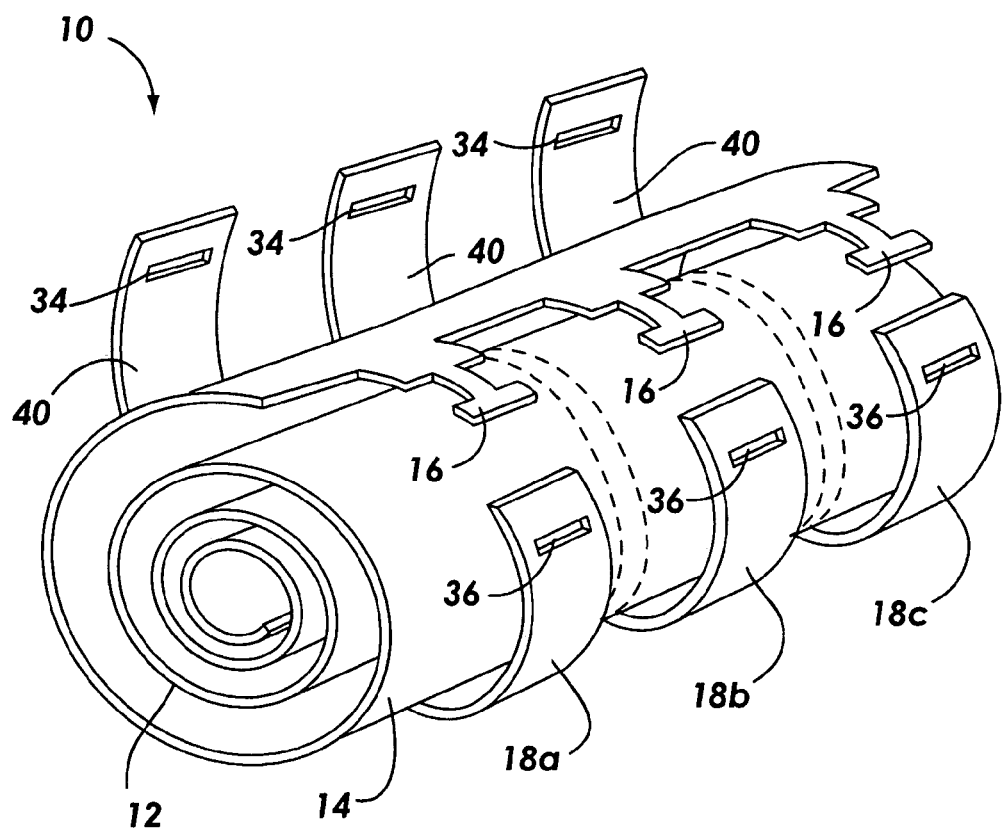
FIG. 2 is a perspective view of the first embodiment of the cushion retention system with the inflatable cushion shown in a folded condition.
Figure 3:
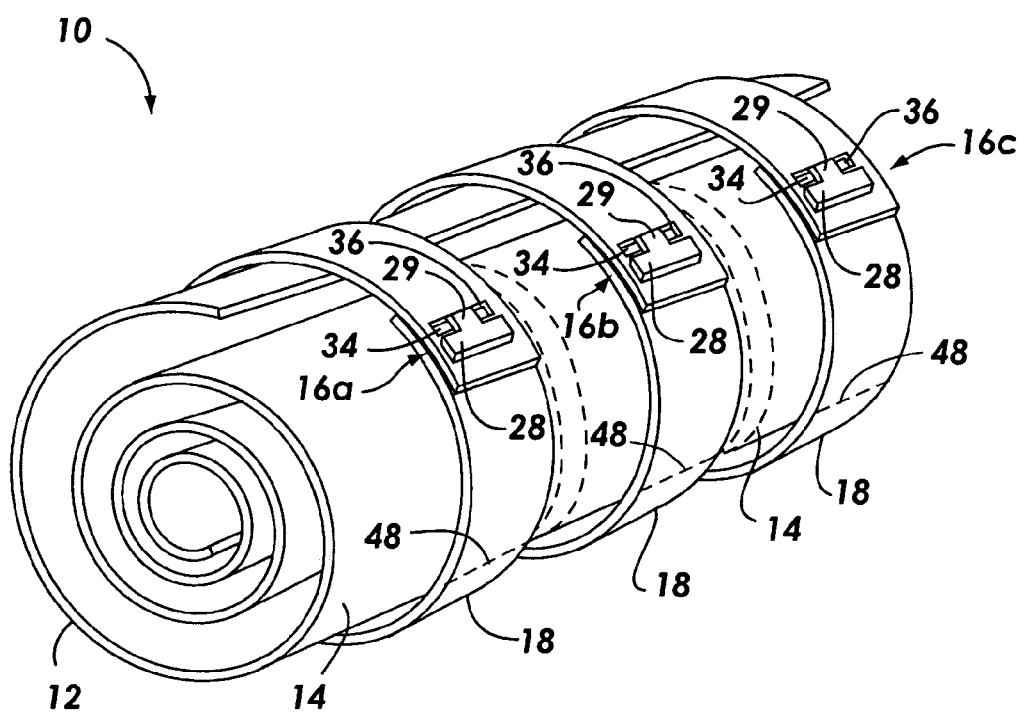
FIG. 3 is a perspective view of the first embodiment of the cushion retention system having supporting members secured around the inflatable cushion to retain the cushion in a folded condition.

The system 10 also includes one or more supporting members 18a–c. The supporting members 18 may be embodied as elongated strips 18, as shown in FIG. 1. The supporting members 18 may be made from a flexible material, such as fabric. Each supporting member 18a–c has a first aperture 34a–c, a second aperture 36a–c, and an intermediary region 40a–c disposed between the apertures 34a–c, 36a–c. The intermediary region 40 of each supporting member 18 is sized to surround the cushion 12 when the cushion 12 is in a folded condition, as illustrated in FIGS. 2 and 3.

With reference to FIG. 1, each aperture 34, 36 is sized to receive and interlock with a corresponding tab 16. In the illustrated embodiment, the head 28a of the first tab 16a interlocks with the first and second apertures 34a, 36a of the first supporting member 18a, the head 28b of the second tab 16b interlocks with the first and second apertures 34b, 36b of the second supporting member 18b, and the head 28c of the third tab 16c interlocks with the first and second apertures 34c, 36c of the third supporting member 18c. Each aperture 34, 36 has a width 44 less than a width 46 of the head 28 of the corresponding tab 16. Each neck 29 is more narrow than the corresponding head 28 and slightly more narrow than or about the same size as the corresponding aperture 34, 36. The method by which the tab 16 and apertures 34, 36 interlock will be explained below in connection with FIG. 2–3.

The apertures 34, 36 do not necessarily have the same width 44. The same is true for the heads 28 of the tabs 16, so long as each corresponding head 28 is greater in width than the corresponding aperture 34, 36. For example, the first and third tabs 16a, 16c and the first and second apertures 34, 36 of the first and third supporting members 18a, 18c may be greater in width than the second tab 16a and first and second apertures 34, 36 of the second supporting member 18b.

Each supporting member 18 also includes a tear seam 48. As will be understood by those of skill in the art, the tear seam 48 may be formed using a number of different techniques, such as scoring, perforations, or the use of separate pieces attached together using adhesives, stitching, clips or other mechanical fastening devices. The tear seams 48 rupture and permit the cushion 12 to deploy through the supporting members 18 when supporting members 18 surround the cushion 12.

Referring now to FIG. 2, a perspective view of the first embodiment of the cushion retention system 10 is shown. In this figure, the inflatable cushion 12 shown in a folded condition. More specifically, the inflatable cushion 12 is shown in a rolled configuration. However, other folding techniques may be used within the scope of this invention. For example, a series of folds in alternating directions may be used.

In FIG. 2, the intermediary regions 40 of the supporting members 18 are disposed around and surround the folded cushion 12. The apertures 34, 36 of each supporting member 18a–c are shown proximate each of the corresponding tabs 16, but not interlocked with the tabs 16.

With reference now to FIG. 3, a perspective view of the first embodiment of the cushion retention system 10 of the present invention is shown. The supporting members 18 are secured around the inflatable cushion 12 to retain the cushion 12 in a folded condition. As shown, each head 28 of each tab 16 has been inserted though a corresponding aperture 34, 36 such that each neck 29 is disposed within the corresponding aperture 34, 36. The width 46 (shown in FIG. 1) of each head 28 is greater than a width 44 (shown in FIG. 1) of the corresponding aperture 34, 36 such that the supporting members 18 are retained around and surround the cushion 12. To permit insertion of each head 28 through each aperture 34, 36, the heads 28 are made from a deformable material, such as a fabric. In the interlocked condition shown in FIG. 3, the supporting members 18 apply an inward compressive force to cushion 12 and its chambers 14 to retain the cushion 12 and chambers 14 in a folded condition.

As illustrated, the supporting members 18 are disposed in a parallel configuration. Alternative configurations come within the scope of this invention. For example, the supporting members 18 may be disposed in a diagonal or intersecting pattern such that a single supporting member 18 may be, for example, secured at one end to the first tab 16 and at the other end to the second or third tab 16b–c. Also, the supporting members 18 may be attached to or integrally formed with each other. The number of supporting members 18 may be varied within the scope of this invention.

Each supporting member 18 may include tear seam 48. When the inflatable cushion 12 expands in response to receipt of inflation gas, the tear seams 48 rupture to permit the cushion 12 deploy through the supporting members 18. As will be understood by those of skill in the art, the tear seams 48 may be arranged in various shapes and positions on the supporting member 18 to achieve this purpose.

Figure 4:
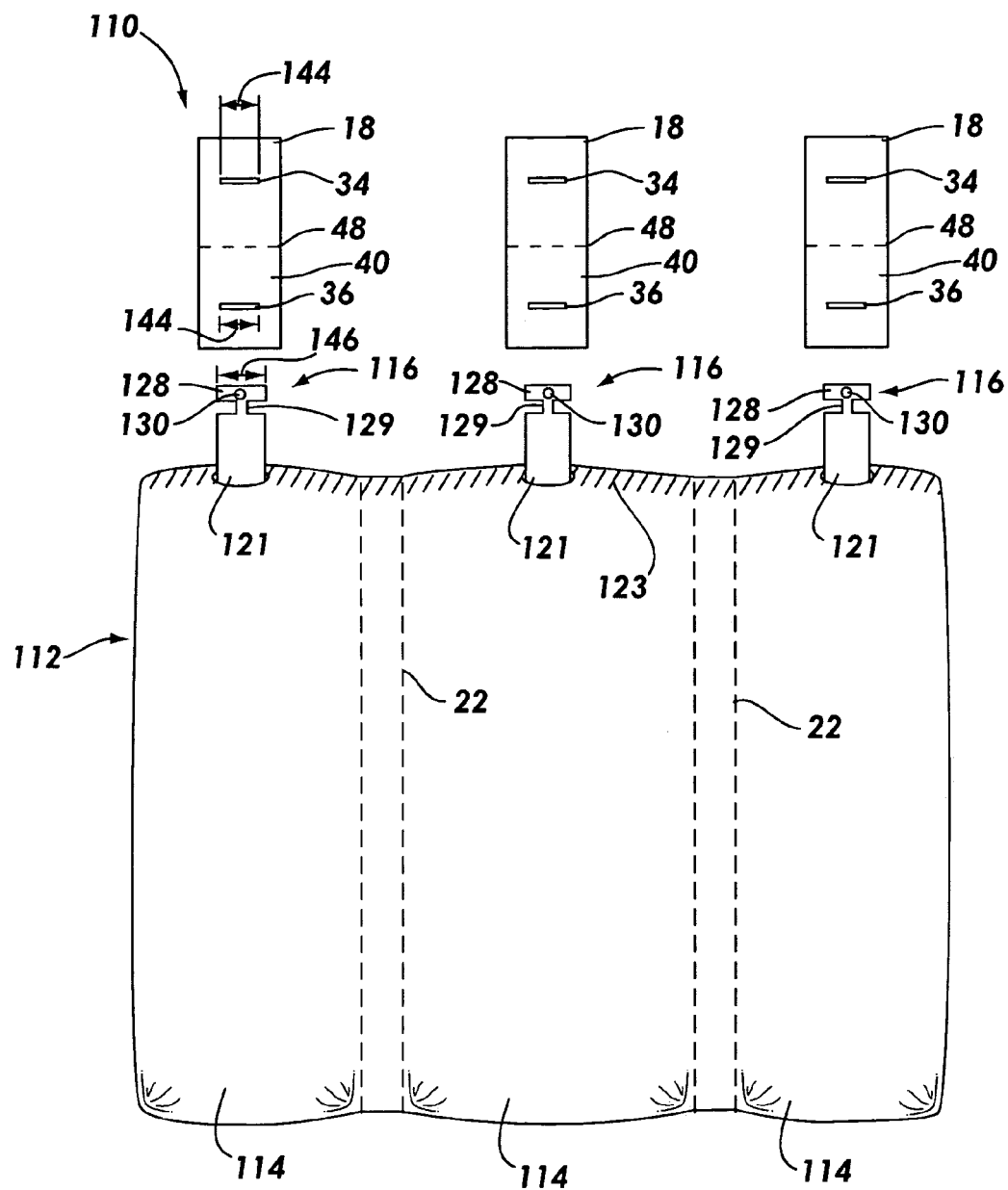
FIG. 4 is a plan view of a second embodiment of the cushion retention system of the present invention having tabs made from a rigid material.

FIG. 4 illustrates a plan view of a second embodiment of the cushion retention system 110 of the present invention. The second embodiment includes an inflatable cushion 112 having one more chambers 114 and tabs 116. As with the first embodiment the second embodiment includes at least one supporting members 18. Each supporting member 18 has a first and a second aperture 34, 36 and an intermediary region 40 disposed between the apertures 34, 36.

The inflatable cushion 12 may be embodied as inflatable curtain 112, as illustrated, or another type of cushion 112 such as a driver's side airbag. As with the first embodiment of the inflatable cushion 12, the inflatable cushion 112 shown in FIG. 4 may include one or chambers 114 having stitching 22 interposed between each chamber 114. Again, the chambers 114 may vary in shape, size, and relative size within the scope of this invention, and may be in fluid communication with each other or may be independently inflatable.

The cushion 112 of the present embodiment also includes orifices 121 for receiving the tabs 116 and optionally includes one or more reinforced regions 123. The orifices 121 are positioned on the cushion proximate the illustrated reinforced region 123. The orifices 121 are sized to receive the tabs 116. In the illustrated embodiment, the orifices 121 comprise slots 121. The number and shape of the orifices 121 may be varied within the scope of this invention. If this's.

The reinforced region or regions 123 may be formed in a number of different ways. For example, a portion of the cushion 112 may be folded over and sewn or otherwise attached to the remainder of the cushion 112. Alternatively, a separate piece of material (not shown) could be attached to the cushion 112. The reinforced region 123 limits damage to or ripping of the area surrounding the orifices 121, particularly during deployment of the cushion 112.

The tabs 116 are secured to the inflatable cushion 112. The tabs 116 of the present embodiment are made from a substantially rigid material, such as a metal or polymer. The tabs 116 may be secured within the orifices 121 using a number of different techniques. For example, if the tabs 116 are made from metal, crimping techniques may be used to secure the tabs 116 to the cushion 112. In other embodiments, the tabs 116 may be secured to the cushion 112 using clips, pins, rivets, bolts, screws, adhesives or other mechanical fastening techniques.

As with the previous embodiments, tabs 116 of the present embodiment include a head 128, and a narrow neck 129 disposed between the head 128 and the cushion 112, and an optional opening 230 for securing the cushion 212 to a vehicle (not shown). Each aperture 34, 36 has a width 144 less than a width 146 of the head 128 of the corresponding tab 116. The neck 129 of each tab 116 is more narrow than the head 128 and is about the same size or more narrow than each aperture 34, 36.

The supporting members 18 are made from a resiliently deformable material, such as fabric. As such, the head 128 of each tab 116 may be inserted through the first and second apertures 34, 36 such that the neck 129 of each tab 116 is securely disposed within the apertures 34, 36. Consequently, the intermediary region 40 can be disposed around and apply an inward compressive force to the cushion 112 to retain the cushion 112 in a folded condition in the manner generally shown in FIG. 3. Again, a tear seam 48 on each supporting member 18 ruptures to permit cushion 112 to expand in response to the receipt of compressed gas.

Figure 5:
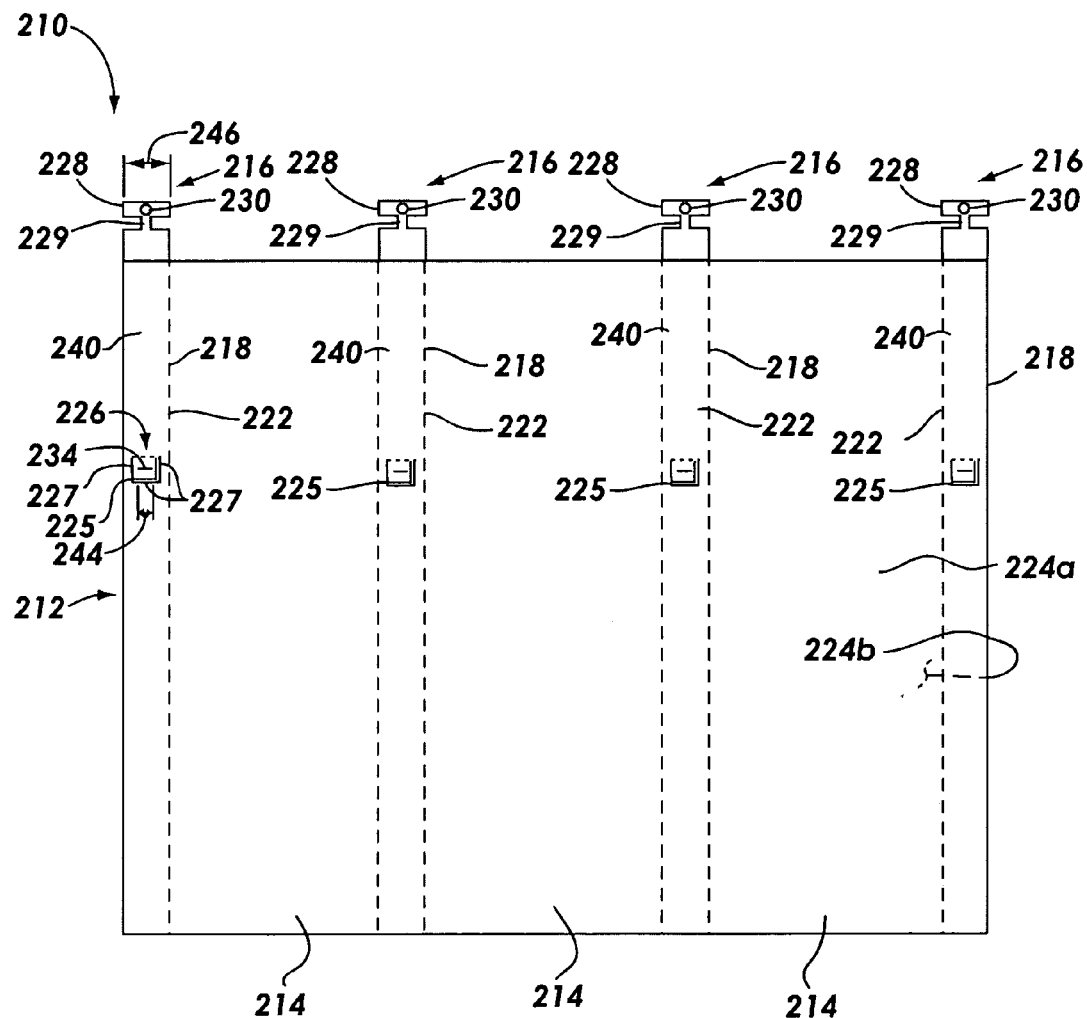
FIG. 5 is a plan view of a third embodiment of the cushion retention system of the present invention having apertures disposed in the inflatable cushion.

Referring to FIG. 5, a plan view of a third embodiment of the cushion retention system 210 of present invention is shown. The third embodiment of this system 210 includes a cushion 212 having one or more chambers 214, tabs 216 integrally formed with or attached to the cushion 212, and supporting members 218.

In contrast to the systems 10, 110 of the first and second embodiments, the supporting members 218 are attached to or integrally formed with the inflatable cushion 212. The illustrated supporting members 218 are disposed between the chambers 214. As shown, stitching 222 is used to fasten opposing sides 224a–b of the cushion 212 together to form the supporting members 218. Various alternative techniques, including, for example, adhesives or ultrasonic welding, may be used to fasten opposing sides 224a–b of the cushion 212 together. In one embodiment, the opposing sides 224a–b are not attached to each other. In an alternative embodiment, the supporting members 218 are separately formed and then attached to the chambers 214.

As illustrated, a supporting member 218 is disposed between each chamber 214. In an alternative embodiment, the cushion 212 includes a single chamber 214 positioned between two supporting members 218. In yet another embodiment, a single supporting member 218 is disposed between two chambers 214.

Those skilled in the art will recognize that the number, size, shape, and position of the chambers 214 and supporting members 218 may be varied within the scope of this invention. For example, the supporting members 218 may be linear or curved in shape. In addition, the supporting members 218 do not necessarily traverse the entire inflatable cushion 212.

Each supporting member 218 includes an extensible flap 225. The extensible flap 225 is attached to the supporting member 218 by a tear seam 226. As illustrated, the extensible flap 225 is a portion of the supporting member 218 formed on three sides by an incision 227 and bounded on the remaining side by a tear seam 226. In an alternative embodiment, a tear seam 226 is disposed around multiple sides of the extensible flap 225. In response to the application of a force to the extensible flap 225, the tear seam ruptures to permit the extensible flap 225 to separate from the remainder of the supporting member 218.

The extensible flap 225 may be embodied in a number of different ways. For example, rather than extracting the extensible flap 225 from the supporting member 218, as shown in FIG. 5, the extensible flap 225 may include a separate piece (not shown) attached to the supporting member 218. In addition, the extensible flap 225 may have various shapes, such as a square, rectangular, or circular shape.

Tabs 216 are also attached to the cushion 212. The tabs 216 be integrally formed with the cushion 212 or may be separately formed and secured to the cushion 212. The tabs 216 may be made from a rigid material, a flexible material, or a combination of the two.

Each tab 216 has a head 228, a narrow neck 229, and an optional opening 230. The head 228 and narrow neck 229 interlock with an aperture 234 on the extensible flap 225. The aperture 234 is sized to receive and interlock with the tabs 216, as will be explained in greater detail below. When the tab 216 and aperture 234 interlock, an intermediary region 240 is sized to be disposed along an outer periphery of the cushion 212 when the cushion 212 is in a folded condition (shown in FIG. 6).

The relative size of each tab 216 and aperture 234 permit the tabs 216 and apertures 234 to interlock with each other. More specifically, a width 244 of each aperture 234 is less than a width 246 of the head 228 of each tab 216. The neck 229 of each tab 216 is narrower than the corresponding head 228. Each neck 229 is also more narrow or approximately the same size as the aperture 234. The apertures 234 may be embodied as slots, as shown, or other shapes within the scope of this invention.

As with the first and second embodiments, Tabs 216 various shapes come within the scope of this invention. The head 228 of each tab 216 may have, for example, a rectangular, square, triangular, or nonsymmetrical shape. The tabs 216 and apertures 234 are not necessarily uniform in size or shape.

As stated above, each tab 216 optionally includes an opening 230. The openings 230 may be used to attach the cushion 212 to a vehicle (not shown). In embodiments in which the openings 230 are omitted, clamps, crimping or other securing techniques and devices may be used to secure the cushion 212 to a vehicle.

Figure 6:
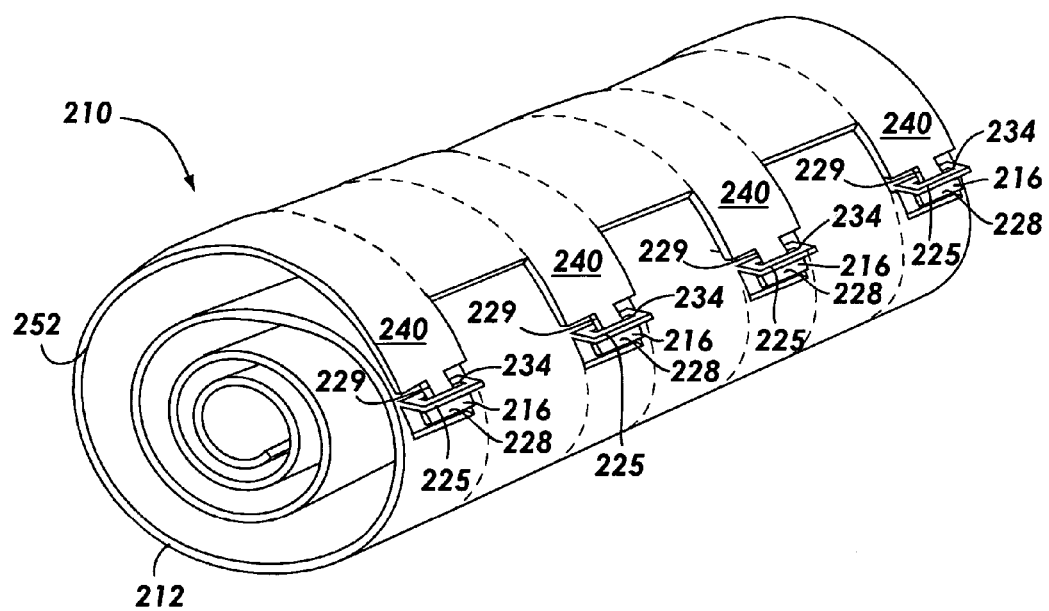
FIG. 6 is a perspective view of the third embodiment of the cushion retention system having supporting members secured around the inflatable cushion to retain the cushion in a folded condition.

FIG. 6 depicts is a perspective view of the third embodiment of cushion retention system 210 of the present invention with the cushion 212 shown in a folded condition. The illustrated cushion 212 shown in a rolled condition. However, those skilled in the art will recognize that alternative folding techniques may be used within the scope of this invention.

In FIG. 6, the intermediary region 240 of each supporting member 218 is disposed along an outer periphery 252 of the folded cushion 212. The tabs 216 have been inserted into and interlock with the apertures 234 of the extensible flap 225. In particular, the head 228 of each tab 216 has been inserted through an aperture 234 and retains the neck 229 of each aperture 234 within the corresponding aperture 234. In this condition, the supporting members 218 apply an inward compressive force to the chambers 214 to retain the chambers 214 in a folded condition.

The cushion retention system thus provides substantial advantages over conventional systems. In particular, the cushion retention system requires fewer materials than conventional retention systems, thus significantly reducing the overall cost of the airbag module. In addition, using this system, the tabs on the cushion are easy to locate and may be rapidly pulled through the cushion retention system. Accordingly, significant cost savings result from the use of this system both in terms of materials and installation time.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A system for maintaining an inflatable curtain in a folded condition, comprising:
    an inflatable curtain;
    a tab having a head and a narrow neck, the tab being attached to the curtain; and
    a supporting member having a first and a second aperture and an intermediary region disposed between the first and second apertures, each aperture being sized to receive and interlock with the tab and having a width less than a width of the head of the tab, the intermediary region being sized to surround and retain the curtain in a folded condition when the first and second apertures interlock with the tab.

2. The system of claim 1, wherein the supporting member is an elongated strip.

3. The system of claim 1, further comprising a tear seam in the supporting member to permit deployment of the curtain.

4. The system of claim 1, further comprising a second tab attached to the curtain and a second supporting member having a first and a second aperture and an intermediary region disposed between the first and second apertures of the second supporting member, wherein the intermediary region of the second supporting member is sized to surround and retain the curtain in a folded condition when the first and second apertures of the second supporting member interlock with the second tab.

5. The system of claim 1, wherein the supporting member is made from a flexible material.

6. The system of claim 1, wherein the tab has an opening that permits attachment of the curtain to a vehicle.

7. The system of claim 1, wherein the tab is made from a substantially rigid material.

* * * * *

UNITED STATES PATENT AND TRADEMARK OFFICE
CERTIFICATE OF CORRECTION

| | | |
|---|---|---|
| PATENT NO. | : 7,125,037 B2 | |
| APPLICATION NO. | : 10/690416 | |
| DATED | : October 24, 2006 | |
| INVENTOR(S) | : Roger Tallerico et al. | |

It is certified that error appears in the above-identified patent and that said Letters Patent is hereby corrected as shown below:

Column 7, line 14, please delete "The inflatable cushion 12" and replace it with --The inflatable cushion 112--.

Signed and Sealed this

Sixth Day of March, 2007

JON W. DUDAS
*Director of the United States Patent and Trademark Office*